(12) United States Patent
Wade et al.

(10) Patent No.: US 7,614,792 B2
(45) Date of Patent: Nov. 10, 2009

(54) COMPLIANT FOIL FLUID FILM RADIAL BEARING OR SEAL

(75) Inventors: Jonathan Wade, Simi Valley, CA (US); Daniel Lubell, Northridge, CA (US)

(73) Assignee: Capstone Turbine Corporation, Chatsworth, CA (US)

(*) Notice: Subject to any disclaimer, the term of this patent is extended or adjusted under 35 U.S.C. 154(b) by 395 days.

(21) Appl. No.: 11/740,798

(22) Filed: Apr. 26, 2007

(65) Prior Publication Data

US 2008/0267543 A1 Oct. 30, 2008

(51) Int. Cl.
*F16C 32/06* (2006.01)
(52) U.S. Cl. .................. 384/104; 384/103; 384/106
(58) Field of Classification Search ......... 384/103–106, 384/119, 124; 277/399, 400, 411
See application file for complete search history.

(56) References Cited

U.S. PATENT DOCUMENTS

| | | | |
|---|---|---|---|
| 4,133,585 A | 1/1979 | Licht | |
| 4,223,958 A | 9/1980 | Gray | |
| 4,465,384 A | 8/1984 | Heshmat et al. | |
| 4,502,795 A | 3/1985 | Klaass et al. | |
| 4,808,070 A | 2/1989 | Fonda-Bonardi | |
| 5,110,033 A | 5/1992 | Noone et al. | 228/160 |
| 5,421,655 A | 6/1995 | Ide et al. | 384/99 |
| 5,427,455 A | 6/1995 | Bosley | 384/106 |
| 5,513,917 A | 5/1996 | Ide et al. | 384/100 |
| 5,531,522 A | 7/1996 | Ide et al. | 384/99 |
| 5,547,287 A | 8/1996 | Zeidan | 384/117 |
| 5,564,836 A | 10/1996 | Ide et al. | 384/122 |
| 5,603,574 A | 2/1997 | Ide et al. | 384/117 |
| 5,613,781 A | 3/1997 | Kuzdzal et al. | |
| 5,743,654 A | 4/1998 | Ide et al. | 384/100 |
| 5,791,868 A | 8/1998 | Bosley et al. | 415/104 |
| 5,902,049 A | 5/1999 | Heshmat | |
| 5,915,841 A | 6/1999 | Weissert | 384/104 |
| 6,170,989 B1 | 1/2001 | Zeidan | 384/117 |
| 6,379,046 B1 | 4/2002 | Zeidan | 384/117 |
| 6,469,411 B2 | 10/2002 | Lembke | 310/90.5 |
| 6,505,837 B1 | 1/2003 | Heshmat | 277/411 |
| 6,588,764 B2 | 7/2003 | Fuller | 277/547 |
| 6,913,265 B2 | 7/2005 | Datta | 277/355 |
| 6,964,522 B2 | 11/2005 | Kang et al. | 384/103 |
| RE39,190 E | 7/2006 | Weissert | 384/104 |
| 7,112,036 B2 | 9/2006 | Lubell et al. | 415/104 |
| 2002/0054718 A1 | 5/2002 | Weissert | |

OTHER PUBLICATIONS

Exhibit A: Printout of Mohawk Innovative Technology, Inc. website re "Compliant Foil Seals" (2004).
Exhibit B: Printout of website of Lulea University of Technology re "EAL Bearing Test Rig" (undated but admitted to be prior art).

*Primary Examiner*—Thomas R Hannon
(74) *Attorney, Agent, or Firm*—Waddey & Patterson, P.C.; Lucian Wayne Beavers (57) ABSTRACT

A compliant foil fluid film bearing or seal apparatus includes a bushing having a plurality of peripherally separate bushing segments. The bushing has a bore defined therethrough, with a peripheral portion of the bore being defined on each bushing segment. A plurality of compliant foils is carried by the bushing, with at least one of the compliant foils being disposed on each bushing segment. A plurality of foil undersprings is disposed beneath the plurality of compliant foils.

41 Claims, 9 Drawing Sheets

COMPLIANT FOIL FLUID FILM RADIAL BEARING OR SEAL

BACKGROUND OF THE INVENTION

1. Technical Field

This invention relates to the general field of compliant foil fluid film bearings and seals.

2. Background Art

Compliant foil fluid film radial bearings are currently being utilized in a variety of high speed rotor applications. These bearings are generally comprised of a bushing, a rotating element such as a rotor or shaft adapted to rotate within the bushing, non-rotating compliant fluid foil members mounted within the bushing and enclosing the rotating element, and non-rotating compliant spring foil members mounted within the bushing underneath the non-rotating compliant fluid foil members. The space between the rotating element and the bushing is filled with fluid (usually air) which envelops the foils. Conventionally, the compliant fluid foil elements are divided into a plurality of individual compliant foils to form a plurality of wedge shaped channels which converge in thickness in the direction of the rotation of the rotor.

The motion of the rotating element applies viscous drag forces to the fluid in the converging wedge channels. This results in increases in fluid pressure, especially near the trailing end of the wedge channels. If the rotating element moves toward the non-rotating element, the convergence angle of the wedge channel increases, causing the fluid pressure rise along the channel to increase. Conversely, if the rotating element moves away, the pressure rise along the wedge channel decreases. Thus, the fluid in the wedge channels exerts restoring forces on the rotating element that vary with and stabilize running clearances and prevent contact between the rotating and non-rotating elements of the bearing. Flexing and sliding of the foils against each other and against the bushing causes coulomb damping of any axial or overturning motion of the rotating element of the bearing.

Owing to preload spring forces or gravity forces, the rotating element of the bearing is typically in physical contact with the fluid foil members of the bearing at low rotational speeds. This physical contact results in bearing wear. It is only when the rotor speed is above what is termed the lift-off/touch-down speed that the fluid dynamic forces generated in the wedge channels assure a running gap between the rotating and non-rotating elements.

Compliant foil fluid film radial bearings typically rely on backing springs to preload the fluid foils against the relatively movable rotating element so as to control foil position/nesting and to establish foil dynamic stability. The bearing starting torque (which should ideally be zero) is directly proportional to these preload forces. These preload forces also significantly increase the rotor speed at which the hydrodynamic effects in the wedge channels are strong enough to lift the rotating element of the bearing out of physical contact with the non-rotating members of the bearing. These preload forces and the high lift-off/touch-down speeds result in significant bearing wear each time the rotor is started or stopped.

Conventional compliant foil fluid film radial bearings operate with extremely small running clearances and moderate, as opposed to low, drag and power consumption. The minimum clearances between the non-rotating fluid foil's converging channel ramp trailing ends and the rotating element are typically less than 100 micro-inches at operating conditions.

While most prior compliant foil fluid film radial bearings utilize a plurality of individual compliant foils and individual spring foils with a cylindrically bored bushing, there are instances where a single compliant foil and a single spring foil have been proposed with a cam shaped or lobed bushing. An example of this type of radial bearing can be found in U.S. Pat. No. 5,427,455 issued Jun. 27, 1995 to Robert W. Bosley, entitled "Compliant Foil Hydrodynamic Fluid Film Radial Bearing", and assigned to the assignee of the present invention.

Another significant development in the design of compliant foil fluid film radial bearings is found in Weissert U.S. Pat. No. RE39,190 reissued Jul. 18, 2006. The Weissert patent discloses a design which utilizes inwardly projecting T-shaped retainers which allow the mounting of segmented compliant foils and foil undersprings in the internal bore of the bushing of the bearing.

It is also known that compliant foil fluid film radial bearings like those of the Bosley and Weissert patents inherently provide a significant sealing function to prevent the flow of fluids, typically gasses, in an axial direction parallel to the axis of the rotating shaft. Thus compliant foil fluid film radial bearings such as those of the Bosley and Weissert patents function both as bearings and seals. The various design parameters of the device can be modified to emphasize either its bearing function or its sealing function.

One example of a device specifically designed to function primarily as a compliant foil seal is shown for example in U.S. Pat. No. 6,505,837 issued Jan. 14, 2003 to Heshmat, entitled "Compliant Foil Seal".

Compliant foil seals potentially are especially suitable for use in high speed high temperature turbomachinery such as gas turbine engines. Traditional seal technology typically used in gas turbine engines utilizes either brush seals which involve a plurality of closely packed bristles which engage the rotor outer surface, labyrinth seals which provide a plurality of grooves in the seal face which closely fits against the rotor, or plain seals which simply provide a close tolerance fit between a bore and a rotor.

In the field of brush seals and labyrinth seals it is also known to construct those seals in a segmented fashion wherein the seal can be disassembled into a plurality of arcuate segments which can then be assembled in place around the rotor of the turbomachinery. For example, segmented brush seals are shown in U.S. Pat. No. 5,110,033 issued May 5, 1992 to Noone et al., entitled "Segmented Brush Seal" and U.S. Pat. No. 6,913,265 issued Jul. 5, 2005 to Datta, entitled "Brush Seal Assembly, Method Of Manufacture And Use". A segmented labyrinth seal is shown for example in U.S. Pat. No. 6,588,764 issued Jul. 8, 2003 to Fuller, entitled "Segmented Labyrinth Seal Assembly And Method".

All of the patent references cited above are incorporated herein by reference.

SUMMARY OF THE INVENTION

The present invention is directed to a compliant foil fluid film radial bearing or seal having a segmented outer bushing which allows the bearing or seal to be broken down into a plurality of separate arcuate segments which aid in the installation or removal of the bearing or seal from its location about the rotor associated with the bearing or seal.

In one embodiment of the invention a compliant foil fluid film bearing or seal apparatus includes a bushing including a plurality of peripherally separated bushing segments, the bushing having a bore defined therethrough, a peripheral portion of the bore being defined on each bushing segment. The device includes a plurality of compliant foils, at least one of the compliant foils being disposed on each bushing segment. A plurality of foil undersprings is disposed beneath the plurality of compliant foils.

In another aspect of the invention a compliant foil fluid film bearing or seal apparatus includes a turbine engine housing, a turbine shaft rotatably disposed in the housing, and a bushing. The bushing includes a plurality of separate bushing segments encircling the shaft, at least one compliant foil carried by each bushing segment for sealing against the shaft, and at least one foil underspring associated with each compliant foil.

In another aspect of the invention the compliant foil fluid film bearing or seal apparatus includes generally T-shaped retainers such as those of Weissert U.S. Pat. No. RE39,190 wherein the T-shaped retainers are split so that one part thereof is defined on one arcuate bushing segment and the other part thereof is defined on an adjacent arcuate bushing segment.

The use of an apparatus having a segmented bushing provides a number of advantages as compared to a non-segmented circular bushing. The use of a segmented bushing may for example allow the apparatus to be used to retrofit existing equipment in which it is not possible to slip the bearing or seal axially down the shaft as is required by single circular bushing structures. It also permits shafts or rotors to be set into the bearing or seal as is required by large rotors or those with multiple radii along the axial length.

The use of a compliant foil fluid film radial bearing having a segmented bushing as a seal permits the bearing to replace other seals, such as brush seals or labyrinth seals, or to simply replace a close tolerance fit between rotating components.

Accordingly, it is an object of the present invention to provide improved compliant foil fluid film radial bearing and/or seal structures.

Another object of the present invention is the provision of a compliant foil fluid film radial bearing or seal structure having a segmented outer bushing.

And another object of the present invention is the provision of compliant foil fluid film radial bearing or seal structures which are segmented for ease of installation and removal from large diameter rotors.

Other and further objects features and advantages of the present invention will be readily apparent to those skilled in the art upon a reading of the following disclosure when taken in conjunction with the accompanying drawings.

BRIEF DESCRIPTION OF THE DRAWINGS

Having thus described the present invention in general terms, reference will now be made to the accompanying drawings in which:

DETAILED DESCRIPTION OF THE PREFERRED EMBODIMENTS

Figure 1:
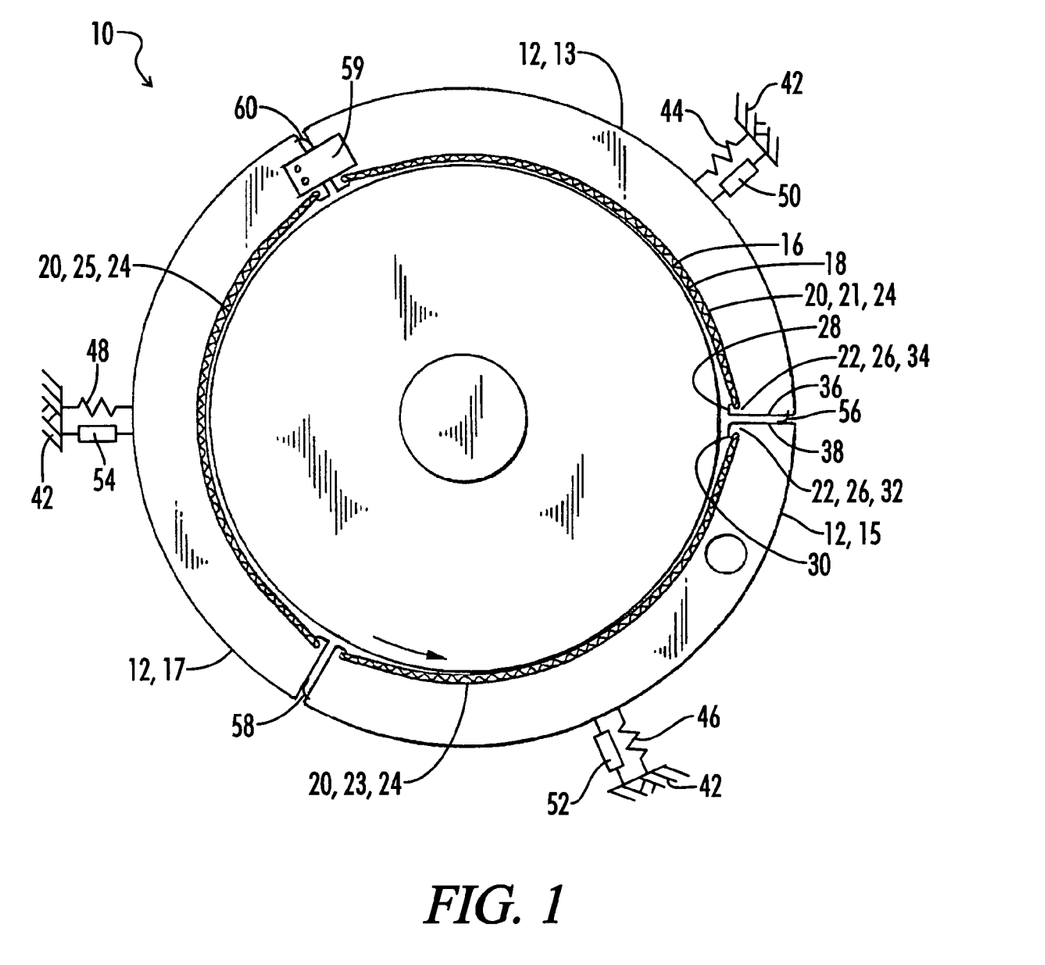
FIG. 1 is an end view of the compliant foil fluid film radial bearing or seal of the present invention.
Figure 2:
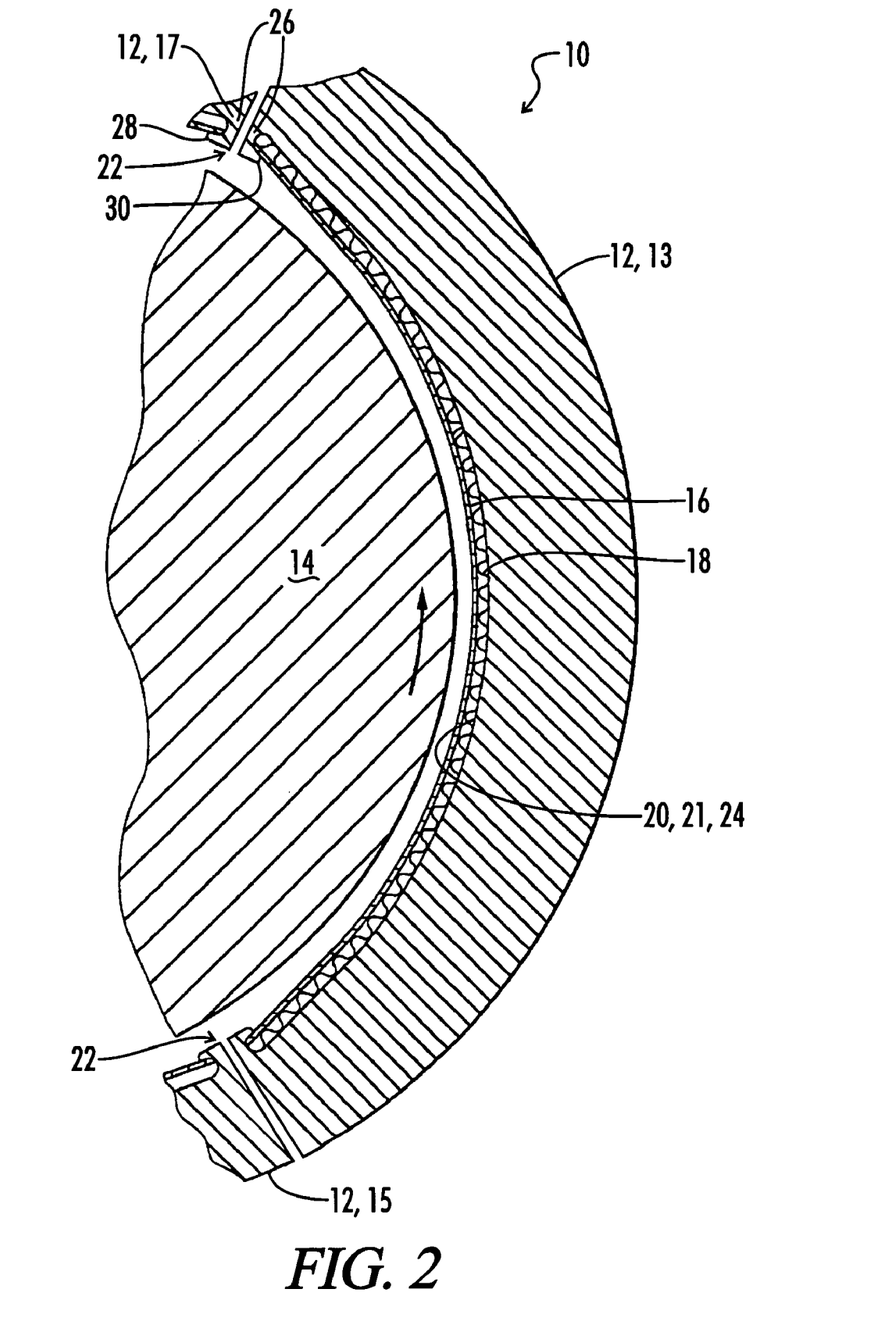
FIG. 2 is an enlarged sectional view of a portion of the compliant foil fluid film radial bearing or seal of FIG. 1.
Figure 3:
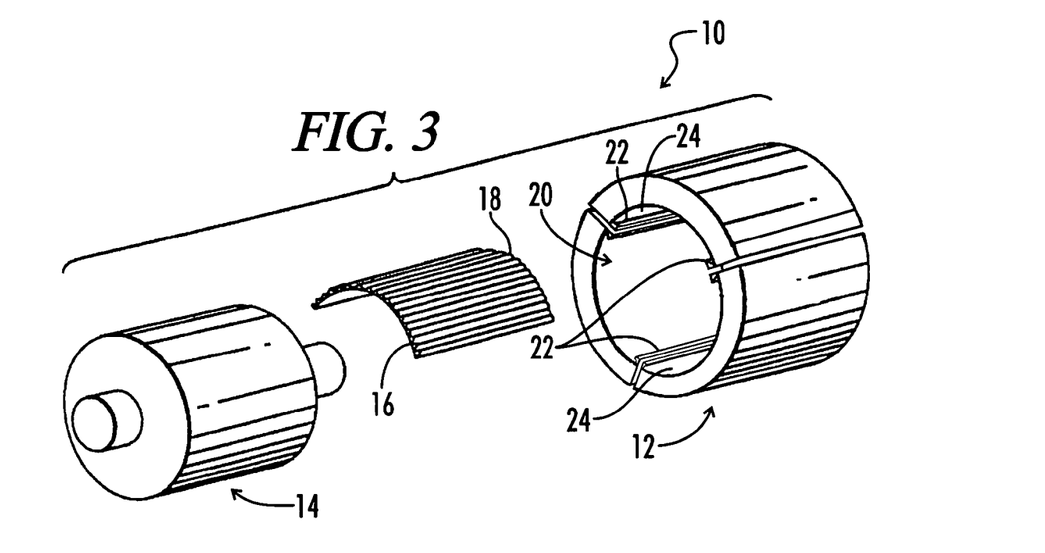
FIG. 3 is an exploded perspective view of the compliant foil fluid film radial bearing or seal of FIGS. 1 and 2.

Illustrated in FIGS. 1-3 is a first embodiment of the compliant foil fluid film radial bearing and/or seal apparatus 10 of the present invention. This apparatus 10 generally comprises a bushing 12, a shaft or rotor 14, a plurality of compliant foils 16 (shown as three), and a like plurality of foil undersprings 18.

Figure 5:
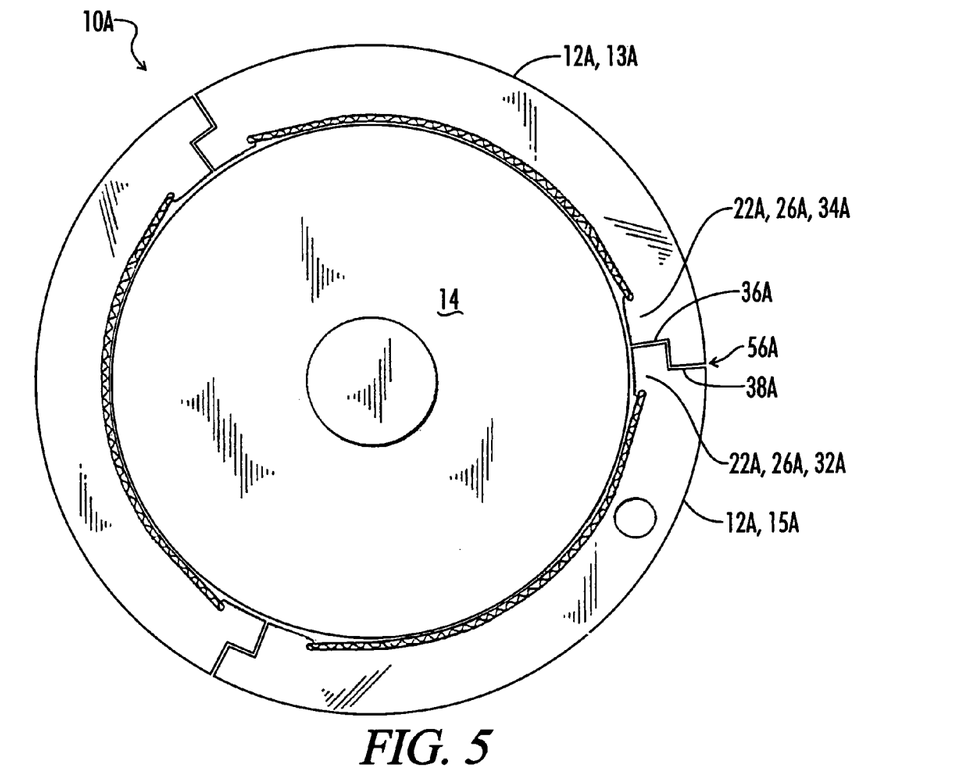
FIG. 5 is an end view similar to FIG. 1 of a compliant foil fluid film radial bearing or seal showing an alternative form of peripheral end seal between adjacent bushing segments.
Figure 5A:
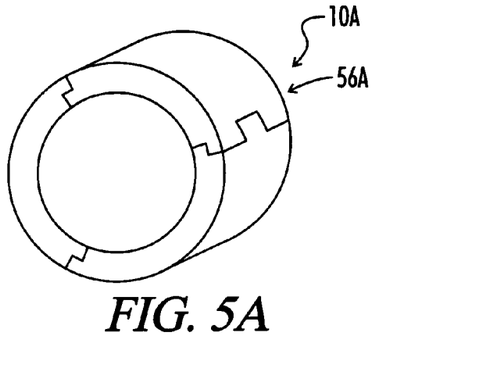
FIG. 5A is a perspective view of the apparatus of FIG. 5.
Figure 12:
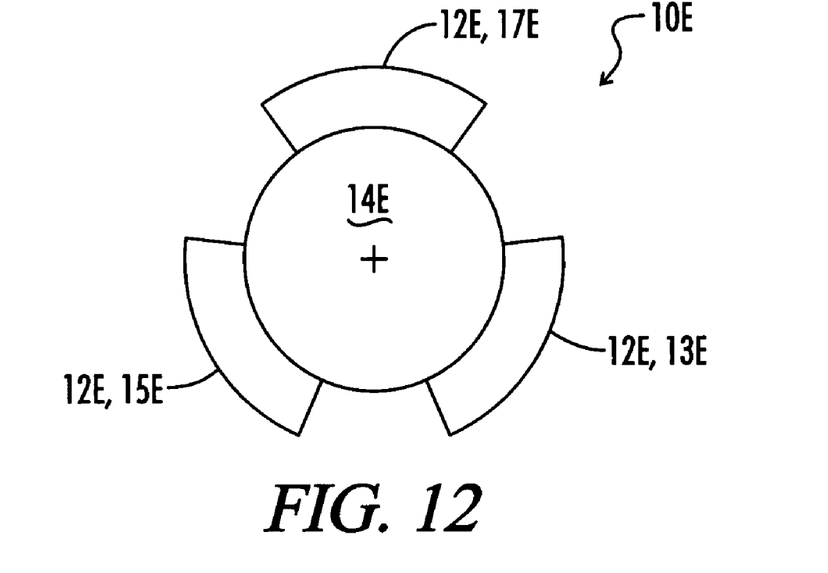
FIG. 12 is a schematic end view of a segmented compliant foil fluid film radial bearing of the present invention which includes several arcuate segments spaced about the circumference of the rotor but encircling less than 360° of the rotor.

The bushing 12, which may also be referred to as a cartridge 12, is made up of a plurality of peripherally separate bushing segments 13, 15 and 17. The bushing 12 has an interior bore 20 defined therethrough with peripheral portions 21, 23 and 25 of bore 20 being defined on the bushing segments 13, 15 and 17, respectively. It is noted that when the bushing segments 13, 15 and 17 are described herein as peripherally separate, that means only that the segments can be separated from each other. It does not mean that they are spaced apart as shown in FIG. 12; they may engage and even overlap as shown in FIG. 5.

The interior bore 20 of the bushing 12 includes a plurality of anti-rotation devices or retainers 22 (shown as three, generally T-shaped retainers) which are equally spaced and extend the axial length of the interior bore 20. The retainers 22 divide the interior bore 20 of the bushing 12 into a like plurality of lobes 24. The compliant foils 16 and the foil undersprings 18 are disposed in each lobe 24 between adjacent generally T-shaped retainers 22. In the embodiment of FIGS. 1-3 there is one lobe 24 per bushing segment 13, 15 or 17. There can, however, be multiple lobes and multiple compliant foils carried by each bushing segment as shown for example in the embodiment of FIG. 7 which is further described below.

While the shaft or rotor 14 is cylindrical, the interior bore 20 of the bushing 12 may or may not be cylindrical. If the interior bore 20 is not cylindrical, the generally T-shaped retainers 22 will divide the interior bore 20 into a plurality of shaped or contoured lobes 24.

Figure 4:
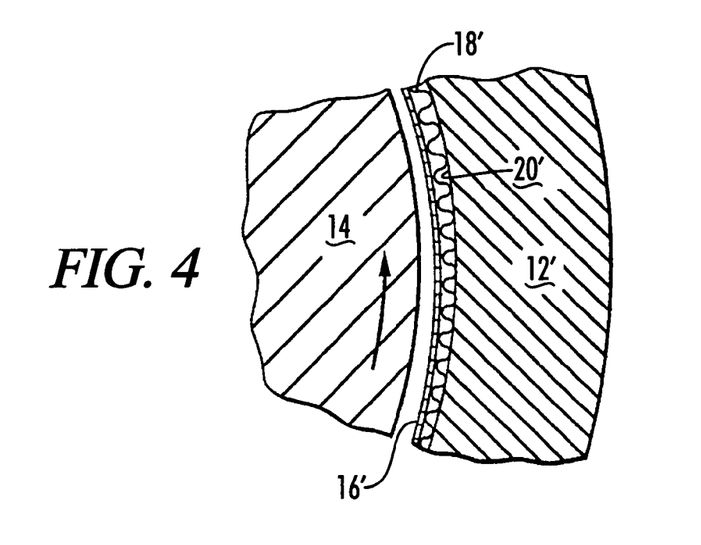
FIG. 4 is an enlarged sectional view of a portion of an alternate compliant foil fluid film radial bearing or seal of the present invention.

On the other hand, if the interior bore 20' of the bushing 12' is cylindrical, the generally T-shaped retainers will divide the interior bore 20' into a plurality of arc segments of a cylinder of equal or unequal spacing and the converging wedges will be formed via the compliant foil 16' and/or the foil undersprings 18' as generally shown in FIG. 4. The height of the foil undersprings 18' may increase from the leading edge of the compliant foil 16' to the trailing edge of the compliant foil 16' in order to form the converging wedge. Alternately, the stiffness of the foil underspring can vary from the leading edge to the trailing edge to produce the same result, or shims of varying height can be positioned underneath the foil underspring.

The generally T-shaped retainers 22 may be symmetrical or conform to the leading edge and trailing edge of the contoured lobes 24. Non-symmetrical T-shaped retainers 22 will retain the foils 16 at different radii from the geometric center with the leading edge of the foils retained at a greater geometric radius than the trailing edge.

The generally T-shaped retainers 22 are formed as part of the contoured interior bore 20 of the bushing 12 with the base 26 thereof extending radially inwards from the interior bore 20. The cross piece of the generally T-shaped retainers 22 has a leading edge 30 and a trailing edge 28, with the leading edge 30 having a greater thickness or width than the trailing edge 28 as best shown in FIG. 2. Since the inner diameter of the cross piece is the same at both the leading edge 30 and the trailing edge 28, this provides a greater diameter or depth for the trailing edge of the contoured lobe 24 which is under the thicker leading edge 30 of the generally T-shaped retainers 22.

The contoured surface of the lobes 24 can be derived from one or a series of radii of a defined profile. For example, in the case of three (3) foil segments, the contour of the lobes 24 in which the compliant foils 16 and underspring foils 18 rest upon can be a multiple of, or a fraction of, a specific number. Also, an appropriate contour can be constructed from vertices of an equilateral triangle of specific length side with circles formed from these vertices intersecting to give the contoured surface which may be machined, ground, EDM'ed or broached. The details of design of the non-circular lobes 24 and undersprings 18 may for example be in compliance with the teachings of U.S. Pat. No. 5,427,455 to Bosley, the details of which are incorporated herein by reference.

Figure 7:
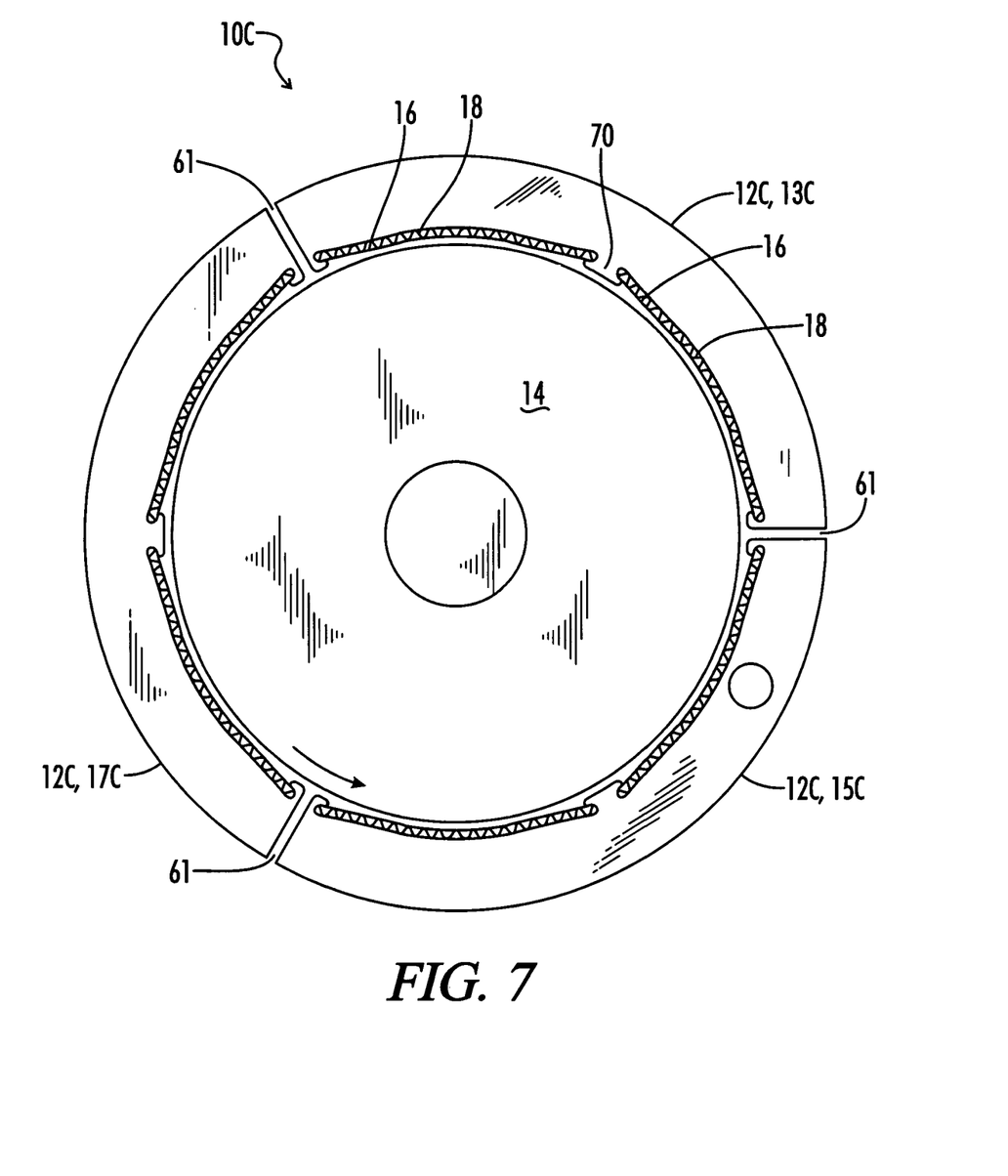
FIG. 7 is an end view similar to FIG. 1 of another embodiment of the compliant foil fluid film radial bearing or seal of the present invention wherein each arcuate bushing segment carries a plurality of individual compliant foils with underlying foil springs.

While a preferred embodiment of the compliant foil fluid film radial bearing or seal apparatus 10 is shown with three (3) compliant foil segments 16 and three (3) foil undersprings 18, a greater number of compliant foils segments 16 and foil undersprings 18 can be utilized. For example, five (5) or more segments may be equally appropriate for the apparatus 10. FIG. 7 illustrates an embodiment with six compliant foil segments 16, two of which are located on each of three bushing segments.

The compliant foils 16 and foil undersprings 18 are trapped and held between adjacent T-shaped retainers 22. The compliant foils 16 would normally have a preformed arcuate shape as shown in FIG. 3. The foil undersprings 18 may have a preformed radius or simply be a rectangular sheet. In either case, the compliant foils 16 and foil undersprings 18 are axially inserted, either separately or together, into the interior bore 20 of bushing 12 between adjacent T-shaped retainers 22. Also, while the foil undersprings 18 are illustrated as a wavy springform, any conventional bearing underspring can be utilized, including the spring described in U.S. Pat. No. 5,427,455. The underspring 18 may have variable spring rates or tapered heights from the leading edge to the trailing edge as shown in FIG. 4.

When trapped between adjacent T-shaped retainers 22, the compliant foils 16 would be pre-loaded in compression between the adjacent T-shaped retainers 22. In some instances, however, the compliant foils 16 may be merely retained in position between adjacent T-shaped retainers 22 without preloading. The foil undersprings 18 would, however, normally be pre-loaded in compression between adjacent T-shaped retainers 22. The foil underspring 18 may contribute to the contoured shape of the compliant foils 16. In most instances, the compliant foils 16 and foil underspring 18 would be separate and would be capable of sliding movement therebetween. There may, however, be instances where the compliant foils 16 and foil underspring 18 will be joined together into a single assembly.

The greater thickness of the leading edge 30 of the T-shaped retainer crosspiece produces a greater depth at the trailing edge of the compliant foils 16 to serve as a means to pull the compliant foils 16 away from the trailing edge of the converging wedge. The trailing edge 28 of the T-shaped retainers 22 has less thickness thereby allowing the leading edge of the foils to rest closer to the shaft, which will facilitate development of the fluid film wedges.

Also, while the compliant foil fluid film radial bearing or seal apparatus 10 can function hydrodynamically, by providing an external source of fluid under pressure, a hydrostatic aspect can be realized. The external pressurized fluid may be introduced axially at the ends of the bushing or through radial holes in the bushing axially along and through the T-shaped retainers 22. The hydrostatic aspect will provide cooling fluid to the interior bore 20 of the bushing 12, which will increase bearing life especially in a gas turbine application. Hydrostatic operation will also increase the load capacity of the bearing.

The apparatus 10 of the present invention allows for automation by mass production and the components can easily be assembled by hand. The compliant foils 16 may be stamped or fine blanked and there is no requirement for spot welding or chemical etching. The large clearances between the compliant foils 16 and the shaft 14 at the T-shaped retainers 22 allow improved cooling of the shaft 14 and compliant foils 16. The design can accommodate a variety of underspring types and the T-shaped retainers 22 permit more design flexibility with respect to the shaft, foil and spring interaction.

Figure 9:
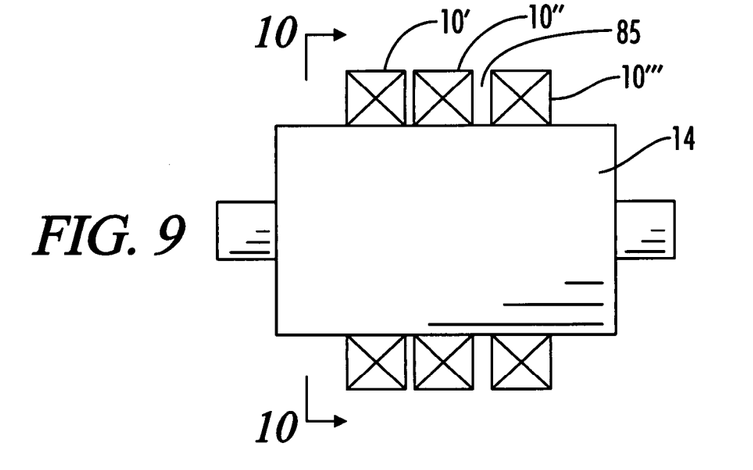
FIG. 9 is a schematic side elevation view showing the use of two axially adjacent compliant foil fluid film radial bearings or seals of the present invention.

As noted the apparatus 10 can be designed to function primarily as a bearing or primarily as a seal or to do both. For example if the design focus of the apparatus 10 is on its sealing characteristics rather than its bearing characteristics the apparatus 10 may be axially much shorter, and there may be multiple axially adjacent apparatus 10 utilized as shown in FIG. 9. When not concerned about dynamic damping of the rotor as one is in compliant foil fluid film radial bearing design, softer more compliant undersprings may be utilized providing longer radial travel and thus improved sealing.

Foil bearing based seals provide unique advantages over conventional oil lubricated rolling equipment and hydrodynamic bearings. With proper design focus shifted to reducing flow through the bearing, a seal can be developed with the following advantages. Small clearances are provided between the bearing and journal on the rotor. Large vibration tolerance as is inherent in a foil bearing is not lost, all the while maintaining a constant tight clearance. A compliant foil based bearing or seal is inherently damage tolerant. Foil bearings have been demonstrated to pass foreign objects through the air film without loss of performance. Unlike lubricated seals, foil bearing seals would not be limited by the temperature capability of oil which is well below 500° F.

In the embodiment of FIG. 1, each of the generally T-shaped retainers 22 has its retainer base 26 axially split into a first part 32 having one of the retainer leading edges 30 attached thereto, and a second part 34 having one of the retainer trailing edges 28 attached thereto. The axially split T-shaped retainer 22 may be described as a generally split T-shaped retainer 22 or retainer base 26.

The split T-shaped retainer 22 may also be described as a generally T-shaped retainer defined on adjacent peripheral ends 36 and 38 of adjacent first and second bushing segments 13 and 15, respectively. The generally T-shaped retainer 22 being axially split so that first and second retaining edges 30 and 28 thereof are located upon the first and second bushing segments 13 and 15, respectively.

As will be understood by those skilled in the art, the rotor 14 with its associated bearing and/or seal apparatus 10 will be located within a machine housing 42 which may for example be a turbine engine housing 42. The apparatus 10 may, for example, provide a pressure seal between adjacent stages of the turbine. The basic construction of the turbine engine may for example be as shown in U.S. Pat. No. 7,112,036 to Lubell et al., the details of which are incorporated herein by reference. In the schematic illustration of FIG. 1, various portions of the machine housing 42 are schematically illustrated, and it is also schematically illustrated that one or more of the bushing segments 13, 15 and/or 17 may be connected to the machine housing 42 by a plurality of flexible attachments schematically illustrated and designated as numbers 44, 46 and 48. The bushing segments 13, 15 and 17 may also be connected to the machine housing 42 by a plurality of adjustable attachments schematically illustrated and identified as numbers 50, 52 and 54. The flexible mounting and adjustable position mounting features may also be incorporated in a single structure. The flexible mounting provided by flexible attachments 44, 46 and 48, may for example be provided by one or more spring members located between the bushing 12 and an annular journal formed in the machine housing 42. The flexible attachment of bushing segments to the housing allows for movement of the rotor 14, irregular surfaces or the shape or location of the machine housing.

In high temperature environments the flexible mounting may for example be provided by steel spring structures. In low temperature environments the flexible mounting could even be provided by elastomeric structures. The flexible mounting could also be integrally formed from the same material as the bushing 12 and the entire integral structure may for example be machined using EDM techniques to cut the steel stock from which the bushing segments are formed.

The adjustable positioning attachments 50, 52 and 54 may be provided by any suitable mechanical attachment including hydraulic, pneumatic and mechanically adjustable support structures. Those same structures, particularly the hydraulic and pneumatic structures may inherently provide a resiliency to also provide the flexible attachment schematically illustrated at 44, 46 and 48.

In some applications it is desirable that peripheral end seals such as 56, 58 and 60 be provided to seal between each two adjacent peripheral ends such as 36 and 38 of adjacent bushing segments such as 13 and 15. In the embodiment of FIG. 1, the seals 56, 58 and 60 are shown as simple leaf spring strips having one end embedded in one of the bushing segments and flexibly engaging the peripheral end of the adjacent bushing segment. The seals 56, 58 and 60 are designed to impede radial flow of gases between the bushing segments. Also axial flow seals such as 59 shown in FIG. 1 may be provided to impede axial flow of gases between peripheral ends of adjacent segments.

In other applications it may be preferred not to have peripheral end seals, and in fact to have a peripheral spacing 61 between adjacent segments as shown in FIG. 7. Such peripheral spaces 61 may for example be provided so that a cooling gas flow is present to cool the apparatus.

FIG. 5 is a view similar to FIG. 1 showing an alternative embodiment for the peripheral end seals wherein adjacent bushing segments overlap each other to form the peripheral end seals. In the embodiment of FIG. 5, elements analogous to those shown in FIG. 1 utilize the same identifying numbers except for the addition of a suffix A, thus it is seen that the peripheral ends 36A and 38A of bushing segments 13A and 15A are formed in what may be generally described as a tongue and groove fashion wherein they overlap with each other to aid in forming a peripheral end seal 56A therebetween. A similar overlapping along the length of the peripheral edges may be formed as shown in FIG. 6A.

Figure 6:
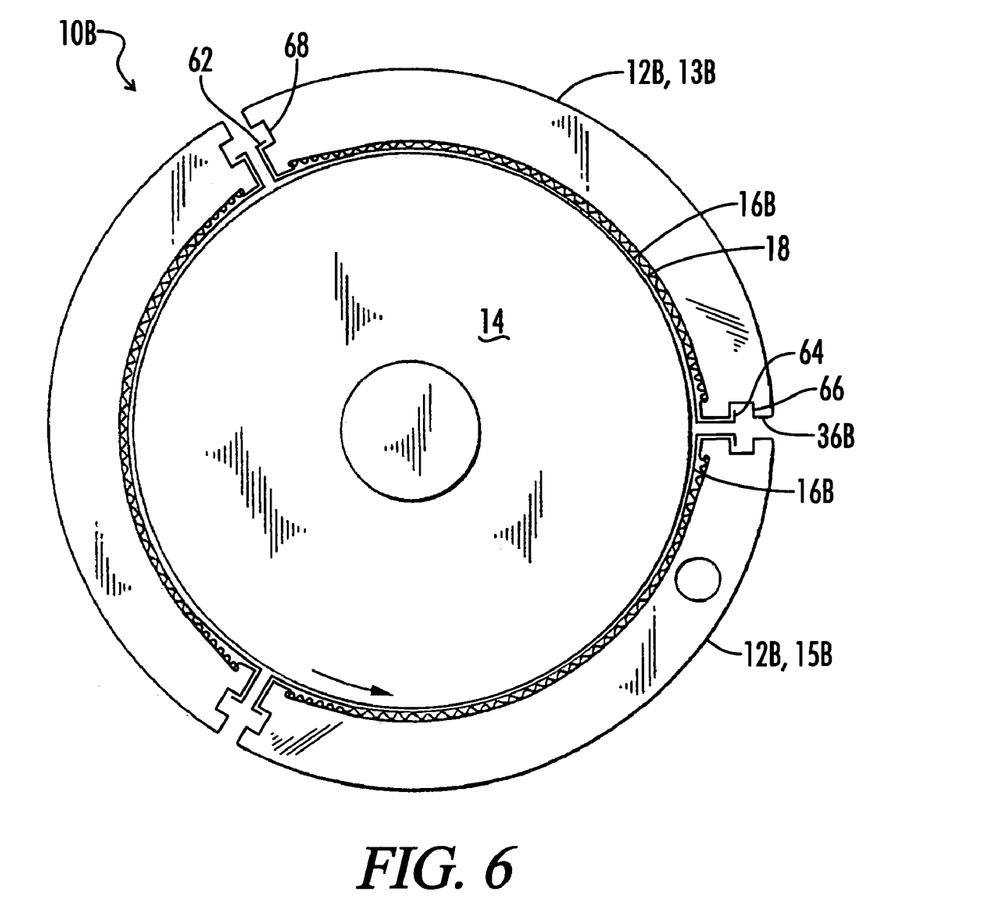
FIG. 6 is an end view similar to FIG. 1 of an alternative embodiment of the compliant foil fluid film radial bearing or seal of the present invention showing an alternative manner of mounting the compliant foils and providing a peripheral end seal between adjacent segments.

FIG. 6 illustrates still another alternative embodiment providing another mounting arrangement for the compliant foils and another peripheral end sealing arrangement between adjacent segments. In the embodiment of FIG. 6, analogous elements carry a suffix B as compared to the elements of FIG. 1.

In FIG. 6, the apparatus 10B has modified compliant foils 16B. For example the compliant foil 16B carried by bushing segment 13B has its peripheral ends 62 and 64 wrapped around the peripheral ends such as 36B thereof and turned back into and received in grooves such as 66 and 68 formed in the peripheral ends of bushing segment 13B.

In this embodiment the foil undersprings 18 are constructed the same as shown in FIG. 1 and are held in place under the edges 28 and 30 of the retainer bases 26 as in FIG. 1, but the compliant foils 16B are modified as described so that rather than being held under the edges of the T-shaped retainers, they wrap around the peripheral ends of the bushing segments and are received in the grooves 66 and 68 as described above.

The compliant foils 16B of adjacent bushing segments such as 13B and 15B may abut each other where they wrap around their adjacent peripheral ends to thus provide a peripheral end seal between adjacent bushing segments. Additional peripheral end seals like 58 and/or 59 shown in FIG. 1 may also be utilized in conjunction with the structure illustrated in FIG. 6.

In each of the three embodiments shown in FIGS. 1, 5 and 6 each bushing segment carries a single compliant foil with associated underspring. It will be appreciated, however, that each bushing segment can carry two or more compliant foils with associated undersprings.

Thus, for example, in FIG. 7 a compliant foil radial bearing or seal apparatus generally designated by the numeral 10C includes a bushing 12C made up of three bushing segments 13C, 15C and 17C. A split T-shaped retainer base is located at the adjacent peripheral ends of each two adjacent bushing segments and is constructed as described above with regard to FIG. 1. At an intermediate location on each of the bearing segments is a non-split T-shaped retainer base 70 which provides retainer edges so that two of the resilient foils 16 with undersprings 18 are carried by each of the bushing segments. Furthermore, the foils 16 may be of different peripheral lengths or of equal lengths on each segment. Also in any of the embodiments described, the segments making up the bushing may be of different peripheral lengths, they do not all have to be of equal lengths.

Although in each of the embodiments illustrated in FIGS. 1, 5, 6 and 7 the bushing 12 thereof has been made up of three bushing segments 13, 15 and 17, it will be appreciated that the segmented bushing can have any number including two or more bushing segments. Particularly when used with very large turbomachinery which may for example have rotating shafts on the diameter of several feet, the bushing may be segmented into any suitable number of bushing segments including as many as a dozen or more bushing segments.

Figure 8:
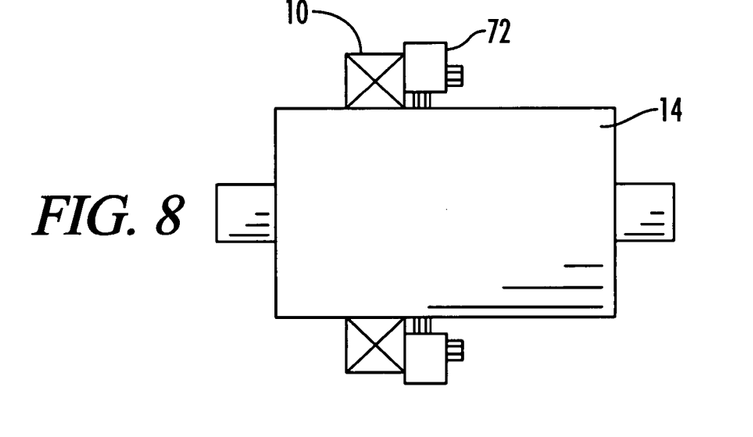
FIG. 8 is a schematic side view showing the use of the compliant foil fluid film radial bearing or seal of the present invention in combination with an adjacent seal of conventional design such as a brush seal or labyrinth seal.
Figure 10:
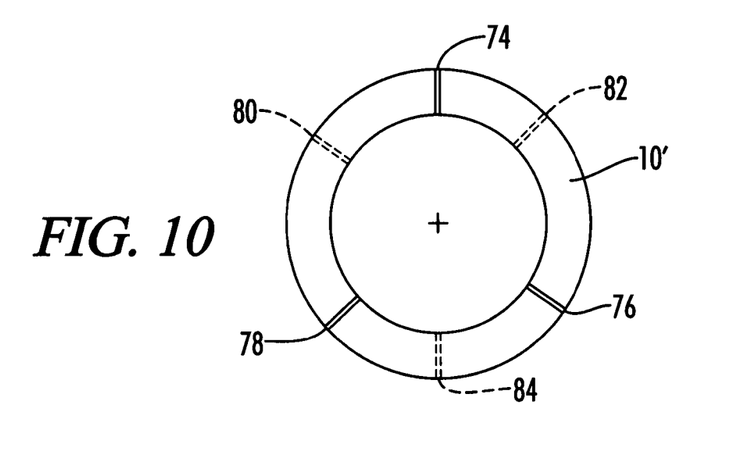
FIG. 10 is an end view taken along line X-X of FIG. 9 which illustrates the manner in which the junctions between adjacent arcuate segments of each of the radial bearings or seals of FIG. 9 are peripherally staggered relative to the axially adjacent seal.

Turning now to FIGS. 8-10, the manner in which the apparatus 10 of the present invention may be utilized in combination with one or more additional seals of more conventional design, or with one or more additional seals or bearings of the present design is shown.

For example in FIG. 8, an auxiliary seal 72 is located adjacent the first bearing or seal apparatus 10. The auxiliary seal 72 may for example be a conventional seal selected from the group consisting of brush seals and labyrinth seals. The auxiliary seal 72 may also be a segmented seal and in that case, the auxiliary seal is preferably segmented into a plurality of auxiliary seal segments equal in number to the plurality of bushing segments of the apparatus 10. The auxiliary conventional non-contacting annular seal 72 is preferably mounted to the cartridge or bushing 12. The conventional seal 72 is mounted such that it maintains an effective radial clearance that is maintained nearly constant, affected only by the compression of the spring element 18 within the foil seal. The foil seal then acts as a follower to the rotor providing clearance control of the conventional seal, and increasing the sealing effectiveness of both the foil seal 10 and the conventional seal 72 independently. There can of course be more than one adjacent conventional seal, and the seals can be placed in any order. There could for example be an alternating series of foil seal, conventional seal, foil seal and conventional seal.

FIG. 9 schematically illustrates the use of two of the bearings or seals 10' and 10'' of the present invention disposed axially adjacent to each other. In this case, as is best shown in the schematic end view of FIG. 10 taken along line X-X of FIG. 9, the junctions such as indicated at 74, 76 and 78 in solid lines between adjacent bushing segments of the first apparatus 10' are peripherally staggered relative to the junctions such as 80, 82 and 84 between adjacent segments of the second apparatus 10'' which are shown in dashed lines in FIG. 10. This peripheral staggering of adjacent ends will particularly aid in the combined sealing function of the two adjacent apparatus 10' and 10''. It is of course possible to use more than two of the bearing or seal assemblies 10 along the axial length of the shaft to permit increased bearing loading or improve sealing or both. When using adjacent structures such as 10' and 10'', it is also very effective for one of the compliant foil structures such as 10' to be designed to primarily provide a bearing function, whereas the adjacent compliant foil structure 10'' may be designed to provide primarily a sealing function. The adjacent structures may abut each other as shown for 10 and 10' in FIG. 9, or they may have an axial spacing 85 along the rotor 14 as shown for 10'' and 10''' in FIG. 9. Such an axial spacing 85 may be designed to improve the overall sealing function by allowing recirculation of gas in the axial space, and/or the spacing may be designed to improve rotor dynamics by affecting the stiffness and damping of the overall support provided to the rotor 14 by the combination of bearings and seals supporting the rotor 14.

Also it is even possible within one or more of the structures 10 to design some segments to function primarily as bearings and some segments to function primarily as seals. Two such structures could be axially adjacent and be rotationally indexed so that a bearing segment of one structure was axially adjacent a sealing segment of the second structure.

In each of the embodiments described and illustrated to this point, the bushing segments comprising the bushing 12 substantially completely encircle the rotor 14 and form substantially a 360° bearing and/or seal about the rotor 14. Such a structure as noted may be utilized either primarily as a bearing or primarily as a seal, or it may be designed to provide a combination of both bearing and sealing functions as desired. And as noted regarding FIG. 7, such a structure may have small gaps 61 to provide a cooling air flow.

It is possible, however, when utilizing a compliant foil fluid film radial bearing with a segmented bushing solely as a bearing, to design the same so that the bushing segments do not completely encircle the rotor and thus wherein the bore defined therein comprises substantially less than 360°.

Figure 11:
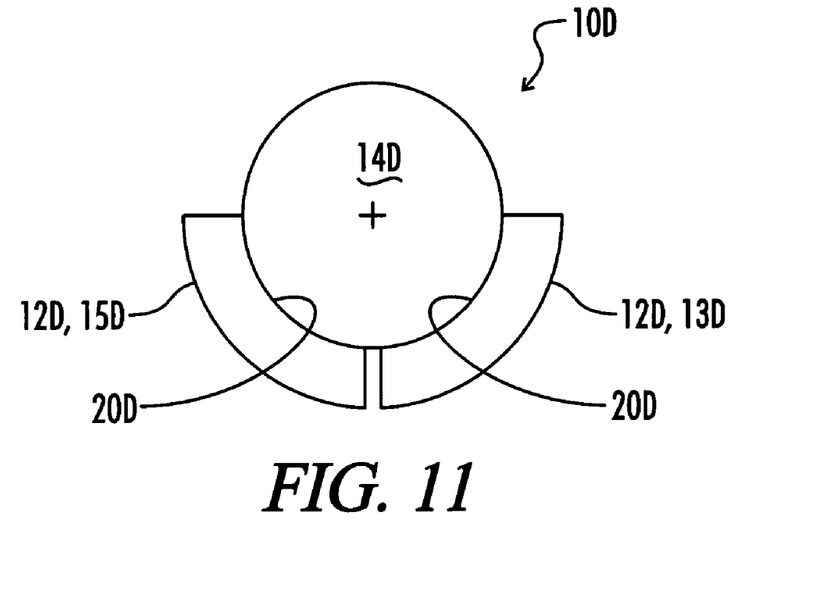
FIG. 11 is a schematic end view of a segmented compliant foil fluid film radial bearing of the present invention which encircles 180° of the rotor.

For example, in the schematic end elevation view of FIG. 11, a compliant foil fluid film radial bearing apparatus 10D is shown having a bushing 12D made up of two bushing segments 13D and 15D each comprising an arc of approximately 90° so that the bore 20D defined therein is a substantially semi-cylindrical bore broken into two components. Each of the bushing segments 13D and 15D will carry one or more compliant foils and undersprings which may be constructed as described above with regard to FIG. 1. The embodiment of FIG. 11 is particularly appropriate for massive rotating shafts which do not require stabilization, but rather simply require low friction rotation.

Referring now to the embodiment schematically illustrated in FIG. 12, the apparatus 10E thereshown includes a bushing 12E made up of a plurality of bushing segments 13E, 15E and 17E which are peripherally spaced from each other by a substantial amount, such that the overall structure no longer provides a seal against axial gas flow. Again, each of the bushing segments 13E, 15E and 17E will carry one or more compliant foils with associated undersprings constructed in a manner as generally described above with regard to any of the prior embodiments.

Figure 13:
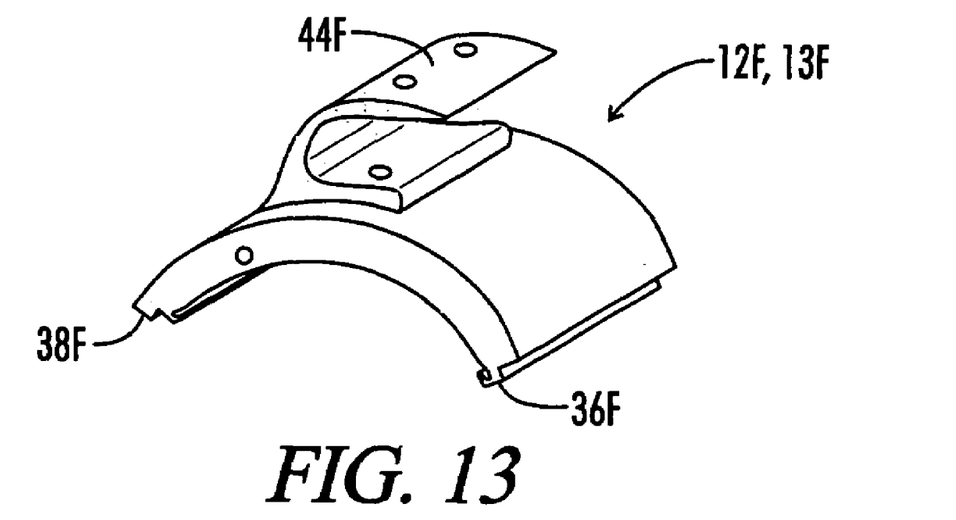
FIG. 13 is a perspective view of a bushing segment similar to that of FIG. 5 with overlapping peripheral ends, and with an integrally formed resilient mounting member.
Figure 14:
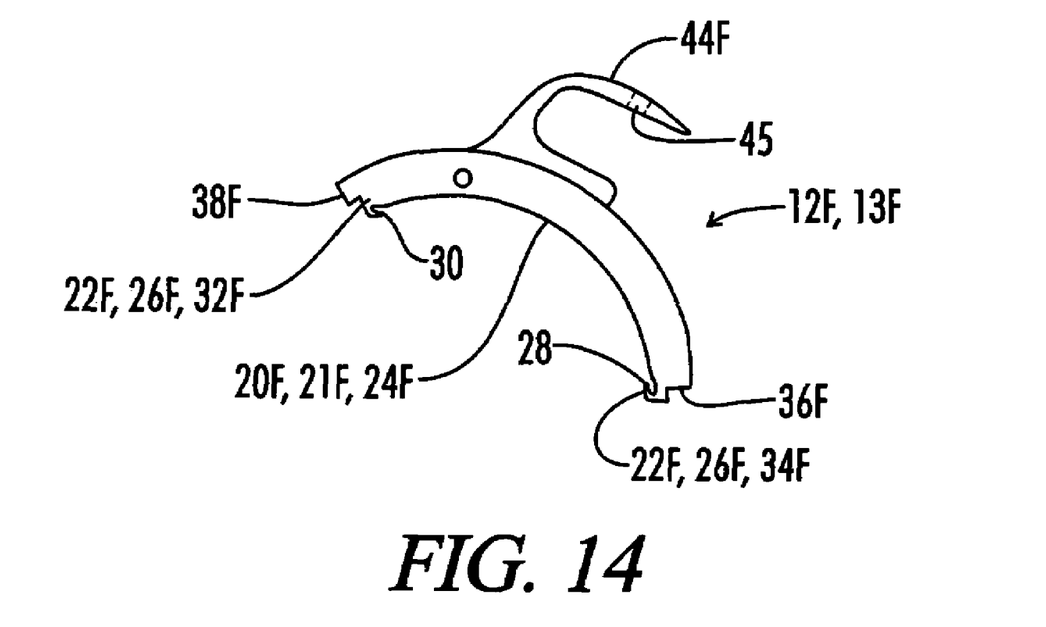
FIG. 14 is an end view of the bushing segment of FIG. 13.

Referring now to FIGS. 13 and 14, perspective and end views are shown of a bushing segment similar to those described above regarding FIG. 5 having overlapping peripheral ends, with an integrally formed resilient mounting member. Parts analogous to those of the structure in FIGS. 1 and 5 carry like numerals with a suffix F. The bushing 12F includes a plurality of segments such as 13F. Split-T shape retainers 22F are defined at adjacent ends of adjacent segments, with each retainer 22F having a retainer base 26F split into two parts 32F and 34F. The first part 32F has one of the retainer leading edges 30 attached thereto, and the second part 34F has one of the retainer trailing edges 28 attached thereto. A compliant foil 16 and underspring 18 will be received between the edges 28 and 30. The peripheral ends 36F and 38F are designed like described above regarding FIG. 5 so that they form an overlapping peripheral end seal. A resilient mounting member 44F is formed integrally with the bushing segment 13F. The mounting member 44F may have bolt holes 45 formed therein to allow the segment 13F to be bolted to a surrounding engine housing.

The apparatus 10 of FIGS. 1-10 and 13-14 provides an effective gas seal for rotating equipment based upon compliant elements which will form a thin air film against the rotor 14 which restricts flow in directions orthogonal to the direction of rotation while permitting large travel of the rotor. This solves the problem of having effective seals in a high temperature environment which will tolerate vibrations and thermal growth effectively, even at extremes of each. Typical solutions in the prior art have been radically different, utilizing brush seals, labyrinth seals or plain seals having tight clearances with rigid structures. With the present invention, the apparatus 10 provides a compliant surface via the compliant foil 16, backed by a flexible support surface via the underspring 18, and the bushing or cartridge structure 12 to keep the compliant foils and undersprings together.

There are some specific advantages of compliant foil seals over other seal types in certain situations. The wear mechanism of a foil bearing or foil seal does not lead to a change in clearance. In other types of bearings or seals the wear mechanism increases clearances and thus leakage. For a compliant foil bearing or seal the leakage may be higher than other types when the others are new, but it can be lower when the others are old. The leakage of a compliant foil bearing or seal is very predictable and stable, and thus can be depended upon as a design component of the machine in which it is installed. For example a planned amount of axial air flow past the bearing or seal may be desired for cooling of the bearing or seal and adjacent structures.

Also it is noted that while the compliant foil bearings and seals discussed above have been described in terms of air as an operating environment, these devices can be designed to work with any compressible or incompressible fluid. The compressible fluid may be air or it may be any other gas.

While specific embodiments of the invention have been illustrated and described, it is to be understood that these are provided by way of example only and that the invention is not to be construed as being limited thereto but only by the proper scope of the following claims.

What is claimed is:

1. A compliant foil fluid film bearing or seal apparatus, comprising:
   a bushing including a plurality of peripherally separate bushing segments, said bushing having a bore defined therethrough, a peripheral portion of said bore being defined on each bushing segment;
   a plurality of compliant foils, at least one of said compliant foils being disposed on each bushing segment; and
   a plurality of foil undersprings disposed beneath said plurality of compliant foils.

2. The apparatus of claim 1, further comprising:
   a plurality of flexible attachments connected to the plurality of bushing segments for flexibly connecting the bushing to a machine housing.

3. The apparatus of claim 2, wherein at least some of said flexible attachments are adjustable in length for adjusting a position of the bushing within the machine housing.

4. The apparatus of claim 1, further comprising:
   a plurality of adjustable attachments connected to the plurality of bushing segments for connecting the bushing to a machine housing and adjustably positioning the bushing within the machine housing.

5. The apparatus of claim 1, further comprising:
   a second bushing disposed axially adjacent to said first bushing, said second bushing including a plurality of peripherally separate second bushing segments.

6. The apparatus of claim 5, wherein:
   said first and second bushings have junctions between adjacent bushing segments of said first bushing peripherally staggered relative to junctions between adjacent bushing segments of said second bushing.

7. The apparatus of claim 5, wherein the second bushing abuts the first bushing.

8. The apparatus of claim 5, wherein the second bushing is axially spaced from the first bushing.

9. The apparatus of claim 1, further comprising:
   a plurality of peripheral end seals, one of said peripheral end seals sealing between each two adjacent peripheral ends of adjacent bushing segments.

10. The apparatus of claim 9, wherein:
    peripheral ends of said adjacent bushing segments overlap each other to form said peripheral end seals.

11. The apparatus of claim 1, wherein:
    peripheral ends of said adjacent bearing segments overlap each other.

12. The apparatus of claim 1, wherein said bushing segments are peripherally spaced from each other.

13. The apparatus of claim 12, wherein said bore comprises substantially less than 360°.

14. The apparatus of claim 1, further comprising:
    an auxiliary seal located adjacent said bushing, said auxiliary seal being of a type other than a compliant foil fluid film seal.

15. The apparatus of claim 14, wherein said auxiliary seal is of a type selected from the group consisting of brush seals and labyrinth seals.

16. The apparatus of claim 14, wherein said auxiliary seal is segmented into a plurality of auxiliary seal segments equal in number to said plurality of bushing segments.

17. The apparatus of claim 1, wherein said bore is non-circular and the peripheral portion of said bore on each bushing segment defines one or more lobes.

18. A compliant foil fluid film bearing or seal apparatus, comprising:
    a turbine engine housing;
    a turbine shaft rotatably disposed in the housing; and
    a bushing including a plurality of separate bushing segments placed around said shaft;
    at least one compliant foil carried by each bushing segment for sealing against said shaft; and
    at least one foil underspring associated with each compliant foil.

19. The apparatus of claim 18, further comprising:
    a plurality of flexible attachments connecting the plurality of bushing segments to the housing.

20. The apparatus of claim 19, wherein the flexible attachments include adjustable positioning devices.

21. The apparatus of claim 18, further comprising:
    a plurality of adjustable positioning devices connecting the plurality of bushing segments to the housing.

22. The apparatus of claim 18, further comprising:
    a second bushing disposed axially adjacent to said first bushing, said second bushing including a plurality of peripherally separate second bushing segments.

23. The apparatus of claim 22, wherein:
    said first and second bushings have junctions between bushing segments of said first bushing peripherally staggered relative to junctions between bushing segments of said second bushing.

24. The apparatus of claim 22, wherein the second bushing abuts the first bushing.

25. The apparatus of claim 22, wherein the second bushing is axially spaced from the first bushing.

26. The apparatus of claim 18, further comprising:
    a plurality of peripheral end seals, one of said peripheral end seals sealing between each two adjacent peripheral ends of adjacent bushing segments.

27. The apparatus of claim 26, wherein:
    peripheral ends of said adjacent bushing segments overlap each other to form said peripheral end seals.

28. The apparatus of claim 18, wherein:
peripheral ends of said adjacent bearing segments overlap each other.

29. The apparatus of claim 18, wherein said bushing segments are peripherally spaced from each other.

30. The apparatus of claim 18, further comprising:
an auxiliary seal located adjacent said bushing, said auxiliary seal being of a type other than a compliant foil fluid film seal.

31. The apparatus of claim 30, wherein said auxiliary seal is of a type selected from the group consisting of brush seals and labyrinth seals.

32. The apparatus of claim 30, wherein said auxiliary seal is segmented into a plurality of auxiliary seal segments equal in number to said plurality of bushing segments.

33. A compliant foil fluid film bearing or seal apparatus, comprising:
a bushing having an interior bore including a plurality of generally T-shaped retainers axially extending in said interior bore;
a plurality of compliant foils, with an individual compliant foil disposed in said interior bore of said bushing between adjacent generally T-shaped retainers;
a plurality of foil undersprings, with an underspring disposed beneath each of said compliant foils between adjacent generally T-shaped retainers; and
wherein said bushing comprises a plurality of separate bushing segments, each bushing segment having a portion of said interior bore defined thereon.

34. The apparatus of claim 33, wherein:
one of said generally T-shaped retainers is defined on adjacent peripheral ends of adjacent first and second bushing segments, said one generally T-shaped retainer being axially split so that first and second retaining edges thereof are located upon said first and second bushing segments, respectively.

35. The apparatus of claim 33, wherein:
each bushing segment has one and only one compliant foil and one and only one foil underspring disposed thereon.

36. The apparatus of claim 33, wherein:
each bushing segment has a plurality of compliant foils and a corresponding plurality of foil undersprings disposed thereon.

37. A compliant foil fluid film bearing or seal apparatus, comprising:
a bushing having an interior bore including one or more retainer bases axially extending into the interior bore;
one or more compliant foils;
one or more retainer leading edges attached to each of the one or more retainer bases for retaining a compliant foil trailing edge;
one or more retainer trailing edges attached to each of the one or more retainer bases for retaining a compliant foil leading edge;
one or more foil undersprings, each underspring disposed beneath a compliant foil; and
wherein said bushing comprises a plurality of separate bushing segments, each bushing segment having a peripheral portion of said interior bore defined thereon.

38. The apparatus of claim 37, wherein:
one of said retainer bases is located at each peripheral junction between adjacent bushing segments, said one retainer base being axially split into a first part having one of said retainer leading edges attached thereto and a second part having one of said retainer trailing edges attached thereto.

39. The apparatus of claim 38, wherein:
said one retainer base at each peripheral junction comprises a generally split T-shaped retainer base.

40. A compliant foil hydrodynamic fluid film radial bearing or seal apparatus comprising: a cartridge housing defining an aperture having a non-circular, interior contour, a spring foil member disposed within said aperture of said cartridge housing and conforming to said non-circular, interior contour, a fluid foil member disposed within said spring foil member and conforming to the shape of said non-circular interior contour, and a rotor rotatably positioned within said fluid foil member, said spring foil member and said aperture of said cartridge housing wherein, rotation of said rotor generates fluid film forces which support and control the position of said rotor within said non-circular, interior contour of said aperture wherein the cartridge comprises a plurality of separate cartridge segments, each cartridge segment having a portion of said non-circular interior contour of said aperture defined thereon.

41. The apparatus of claim 40, wherein said spring foil member and said fluid foil member comprise a plurality of spring foil segments and a plurality of fluid foil segments, respectively, each of said cartridge segments having at least one of said spring foil segments and at least one of said fluid foil segments disposed thereon.

* * * * *